Nov. 24, 1964   R. B. MOORE   3,158,554
METHOD AND APPARATUS FOR STARTING UP THE DISTILLATION
OF A LIQUID WHICH TENDS TO
BOIL UP AS A LIQUID
Filed Oct. 26, 1959
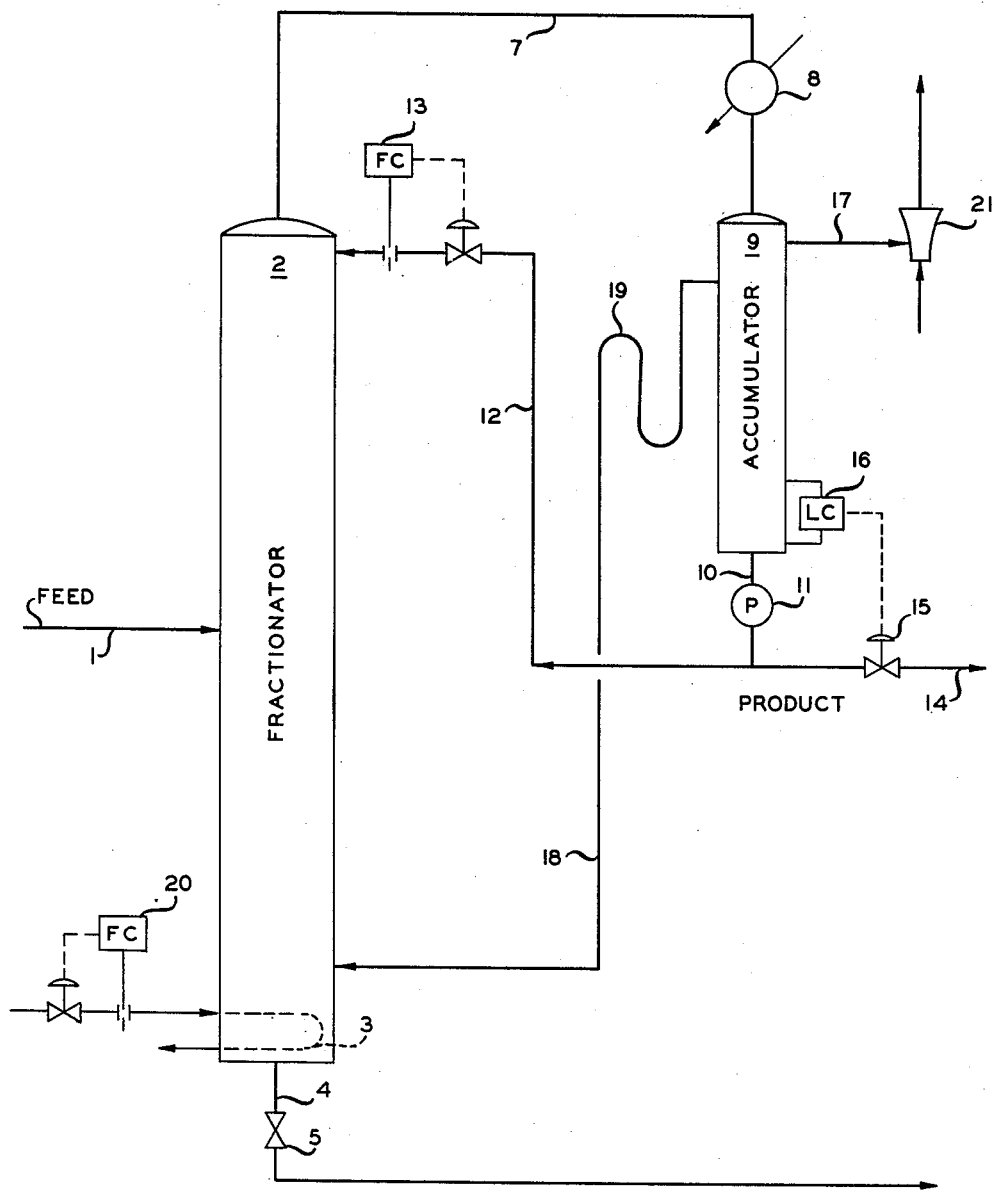
INVENTOR.
R. B. MOORE
BY
Hudson Young
ATTORNEYS

1

3,158,554
METHOD AND APPARATUS FOR STARTING UP
THE DISTILLATION OF A LIQUID WHICH
TENDS TO BOIL UP AS A LIQUID
Robert B. Moore, Lake Park, Fla., assignor to Phillips
Petroleum Company, a corporation of Delaware
Filed Oct. 26, 1959, Ser. No. 848,609
3 Claims. (Cl. 202—49)

This invention relates to the operation of a batch fractionation and to an apparatus therefor. In one of its aspects the invention relates to a method of operating a batch fractionator in which there is a tendency for overhead boil-over to occur especially during start-up or at times when additional material to be fractionated is added to the fractionator or at other times due to then existing circumstances or conditions of operation in which boiled-over material is returned to the kettle of the fractionator from an accumulator adapted to accumulate overhead from the fractionator, said return being made preferably through a vapor seal zone. In another of its aspects, the invention relates to an apparatus especially adapted for batch distillation comprising a distillation vessel, means for heating contents in the bottom of said vessel, means for removing overhead from said vessel, means for accumulating liquefied overhead from said vessel and means for returning from said means for accumulating liquid accumulated therein to the bottom of said vessel. In a further aspect of the invention, the means for returning accumulated overhead to the bottom of said vessel comprises a vapor seal means. In a further aspect of the invention, the start-up of a batch fractionator, for example, in the fractionation of a pyridine containing reaction product, is effected without loss of product by returning boiled-over product from an overhead accumulator which is provided to the kettle of the fractionator at least until such time as there is being formed a sufficient amount of desired accumulated product which can be used as reflux to prevent further boil- or carry-over from the kettle of the fractionator.

It has been experienced that during the start-up of a batch fractionator distilling a pyridine ring containing product, at said time there being a lack of reflux, that the kettle had a tendency to boil violently causing excessive boil-up in the column so that when the overhead product finally reached the accumulator the column was so far out of control that, with maximum reflux and maximum overhead product draw-off, the level still increased in the accumulator to a point at which it overflowed the accumulator through the provided ejector vapor suction line filling the ejector hot well and overflowing to the ground, resulting in high material losses. It was first thought that, to eliminate this loss, it would be necessary that a larger accumulator be provided and it was established that such an accumulator would have to be five times the size of the existing one. Such a large accumulator would have resulted in less efficient column operation and less sensitive column control.

It was conceived that instead of such a greatly enlarged accumulator, which would be expensive, an overflow from the accumulator to the kettle be provided with the advantages that it would handle the excessive overhead product and at the same time help quench the kettle to more rapidly assist in establishing a column control operation. To prevent against vapor loss during established and desired operation, the overflow line was supplied with a vapor seal zone or trap.

An object of this invention is to provide fractionation operation adapted to contend with tendency, during start-up or at other times, to boil over, with consequent loss of product. It is another object to provide a fractionator apparatus adapted to contend with product boiler-over which occurs at start-up and which may occur at other times. It is a further object of this invention to provide method and means in fractionation to avoid loss from the system of boiled-over overhead without having to enlarge an existing overhead accumulator or to provide an unduly large accumulator.

Other aspects, objects and the several advantages of this invention are apparent from a study of this disclosure, the drawing and the appended claims.

According to this invention, there is provided a method of operating a fractionator, especially at start-up when there is available an insufficient amount of reflux and boil-over occurs which comprises returning boiled-over material from an overhead accumulator zone accumulating the same to the kettle of the fractionator. According to the invention, it is particularly applicable in the case of batch distillation operations wherein no reflux is available until some time after the distillation has been commenced.

Also, according to the invention, there is provided a fractionator apparatus essentially comprising a fractionation tower or vessel, means to supply heat to the kettle zone of said vessel, means for removing overhead from the vessel, means for accumulating overhead from the vessel, and means for returning accumulated overhead from said means for accumulating directly to the kettle zone of said fractionator. In a preferred form of the invention, the means for returning accumulated overhead to the kettle of the vessel is provided with a vapor seal zone or trap to prevent escape of vapors from the kettle into the accumulator and vice versa.

The invention is particularly applicable to the batch distillation of a pyridine containing product and will be described in connection with such a distillation. Since the invention is of a physical nature, its applicability to other distillation and/or materials will be apparent to one skilled in the art having been given the information of this disclosure.

Referring now to the drawing, there is fed by way of pipe 1 into tower 2 a pyridine containing feed stock which it is desired to distill, for example, a feed stock containing 2-methyl-5-ethylpyridine. The kettle of fractionator 2 is heated by a steam-heated coil 3. Eventually bottoms are removed by way of pipe 4, controlled by valve 5. The temperature in the kettle of fractionator 2 gradually raises as the lower boiling compounds are removed as overhead products. The rate of addition of steam to the coils 3 is maintained at a constant rate of flow controller 20. Overhead is removed by way of pipe 7, cooler-condenser 8 and received in receiver or accumulator 9. Reflux is passed by way of pipe 10, pump 11, pipe 12 equipped with flow controller 13 to the top portion of tower 2. Excess or production quantities of overhead are removed by way of pipe 14, controlled by valve 15, which, in turn, is controlled by liquid level controller 16. At start-up or at other times when boil-over occurs and the column is not being suitably controlled, receiver 9 tends to overflow into eductor pipe 17 which is diagrammatically shown and by means of which pressure in the system is maintained at a desired produced value when the system is operated at such a reduced pressure. To avoid loss of production to the eductor, there is provided return pipe 18 according to the invention which, as shown, is provided with vapor seal 19. This pipe connects receiver 9 with a point in the bottom of tower 2. The cost of increasing the size of accumulator 9 is five to ten times as much as installing line 18.

The invention is practiced by charging 2000 gallons of feed of the composition given above through line 1 into fractionator 2. Steam is added to coils 3. The pressure in column 2 is maintained at 100 mm. mercury absolute by the use of steam in ejector 21. The temperature in the bottom of fractionator 2 is gradually increased. When a temperature of 230° F. is reached, vapors at a temperature of 170° F. are passed through line 7, through condenser 8 and into accumulator 9. After the vapors are passed through line 7 for a few minutes, the column occasionally floods and liquid is then passed into accumulator 9. Accumulator 9 has a capacity of 30 gallons and is relatively tall compared to its width. Liquid in accumulator 9 overflows through line 18 and into column 2. After this has occurred for a few minutes, the column begins to operate in a proper manner.

Reflux is returned to column 2, from accumulator 9, through line 12 at a rate of 6 g.p.m. Product is withdrawn from line 14 at a rate of 1½ g.p.m. The temperature in the bottom of column 2 is gradually increased to a maximum of 360° F. and the overhead temperature is increased to 230° F. At the completion of the distillation, 380 gallons of kettle product is removed from the process through line 4.

As the vapors continue to pass through vapor line 7, the temperature of the vapors in line 7 increases in steps. By knowing the boiling points of the various compounds being distilled, it can be determined when to switch the flow of product from line 14 into a different vessel. To increase the purity of the overhead product passed into the various vessels, it is desirable that accumulator 9, have a very small hold-up.

The invention has been described as applied to a batch fractionation process. It can also be applied to continuous distillation.

In an operation, fractionating 2-methyl-5-ethylpyridine dehydrogenation products to obtain desired product overhead and polymer as bottoms, it was found possible to start-up the column in usual manner without loss of product due to boil-over and, indeed, return of accumulated overhead served to help quench the kettle until such time as the operation was lined out.

As an illustration of the composition of the feed mixture introduced to the tower, the following is given.

| Component: | Weight percent |
|---|---|
| $CO_2$ | .05 to 0.8 |
| 2-picoline | 1.55 to 1.80 |
| 3-picoline | 1.45 to 1.60 |
| 4-picoline | .05 to .07 |
| 2,5-dimethylpyridine | 1.70 to 1.90 |
| 3-vinylpyridine | 1.00 to 3.00 |
| 2-methyl-5-ethylpyridine | 43.00 to 68.00 |
| 2-methyl-5-vinylpyridine | 15.00 to 28.00 |
| High boiling pyridines | .40 to .45 |
| Polymerized material | .08 to .15 |
| Heavy oil | .20 to .28 |
| Water | 10.00 to 25.00 |

During the distillation, there is added a stabilizing agent to prevent undesired polymerization and, though this agent forms no part of the present invention, it can be one selected from those as set forth, for example, in Patent 2,874,159 or Patent 2,893,995 and other patents to the same assignee.

Reasonable variation and modification are possible within the scope of the foregoing disclosure, the drawing and the appended claims to the invention, the essence of which is that method and means have been provided for returning boiled-over overhead directly from an overhead receiver or accumulator to the kettle of a distillation system to avoid loss of product due to boil-over substantially as set forth and described.

I claim:

1. A method for starting up a distillation column in which heat is supplied to the column to boil the bottoms therein and to which column there is fed for distillation a liquid material which tends to boil-up as a liquid, through and out the top of the column as a liquid, thus flooding with non-distilled liquid, a provided reflux accumulator, normally receiving only overhead which has been a vapor and has been condensed and is an overhead distillate suitable for refluxing the column, as distinguished from said boiled-over liquid, and in which column operation, when boil-over is occurring, there has been generated insufficient real reflux to prevent said boil-over, thus involving a loss of product, and substantial filling of said accumulator with boiled over liquid which is unsuited to reflux the operation, said liquid tending to overflow said accumulator, which comprises the step of directly returning from the accumulator the accumulating boil-over liquid, as a liquid, which tends to overflow the accumulator, to the bottoms being boiled in said column.

2. A method according to claim 1 wherein the boiled-over product is returned to the kettle by steps comprising passing said boiled over product to said kettle by way of a vapor seal.

3. Apparatus for distillation and fractionation of a distilland which has a tendency to boil up as a liquid into and through the top of a distillation vessel into a provided accumulator which comprises, in operative combination:

a distillation vessel;
a conduit for feeding distilland into an intermediate locus of said vessel;
a residual liquid draw-off conduit at the bottom of said vessel;
an overhead take-off conduit at the top of said vessel;
an overhead condensate accumulator;
a condenser;
said overhead take-off conduit communicating with and passing overhead through said condenser and into said accumulator;
a draw-off conduit at the bottom of said accumulator;
a conduit communicating with last-mentioned conduit and the top of said distillation vessel for return of condensate to said vessel as reflux therefor;
a conduit at the top of said condensate accumulator for taking off vapors therefrom; and
a conduit communicating with said condensate accumulator at a point intermediate its top and bottom and with a low portion of said distillation vessel to return excess accumulated boiled-over liquid directly to the kettle of said distillation vessel.

References Cited in the file of this patent

UNITED STATES PATENTS

| 1,501,014 | McAfee | July 8, 1924 |
| 2,438,252 | Richardson | Mar. 23, 1948 |
| 2,476,206 | McCants | July 12, 1949 |
| 2,568,889 | Hanson et al. | Sept. 25, 1951 |

OTHER REFERENCES

"Technique of Organic Chemistry, vol. 4, Distillation," Weissberger, Interscience Pub. Inc., 1951 (pp. 304–308).